United States Patent [19]

Debor

[11] 4,157,761
[45] Jun. 12, 1979

[54] DISCHARGER MECHANISM

[75] Inventor: Harald H. A. Debor, Katevale, Canada

[73] Assignee: S. W. Hooper & Company, Ltd., Sherbrooke, Canada

[21] Appl. No.: 821,952

[22] Filed: Aug. 4, 1977

[30] Foreign Application Priority Data

Feb. 2, 1977 [GB] United Kingdom ............... 4210/77

[51] Int. Cl.² ............................................ B65G 65/44
[52] U.S. Cl. .................................... 414/304; 198/737; 198/747
[58] Field of Search ................. 214/170, 23, 83.3, 82; 222/409, 243; 198/741, 747, 737

[56] References Cited

U.S. PATENT DOCUMENTS

| 2,592,010 | 4/1952 | Cole et al. ...................... 198/741 X |
| 3,128,017 | 4/1964 | Bacoka ......................... 214/17 D X |
| 3,338,435 | 8/1967 | Rey ............................... 214/83.3 X |
| 3,366,255 | 1/1968 | Evans, Jr. .......................... 214/83.3 |
| 3,525,446 | 8/1970 | Grafstrom ...................... 198/741 X |

Primary Examiner—Albert J. Makay

Attorney, Agent, or Firm—Larson, Taylor and Hinds

[57] ABSTRACT

A discharger mechanism is disclosed for discharging solids from the bottom of a pile. The discharger has a single reciprocating stoker rod and thus avoids misalignment and distortion so common in two reciprocating stoker rod discharger mechanisms. The discharger has a single stoker rod extending beneath a pile, one end of the rod being a discharge end, a reciprocating means reciprocates the stoker rod longitudinally. A plurality of stoker cross bars, substantially perpendicular to the stoker rod, are equispaced apart and rigidly attached at their centers thereof to the stoker rod, each of the cross bars has a wedge shaped cross section with a vertical surface facing towards the discharge end and an upward sloped surface facing away from the discharge end at an angle less than 45°. A plurality of fixed floor angles, parallel and equispaced, each of the fixed floor angles interspaced and parallel with each of the cross bars, each floor angle having in cross section an upward sloped surface facing towards the discharge end at an angle greater than 45°, and an upward sloped surface facing away from the discharge end at an angle less than 45°.

3 Claims, 8 Drawing Figures

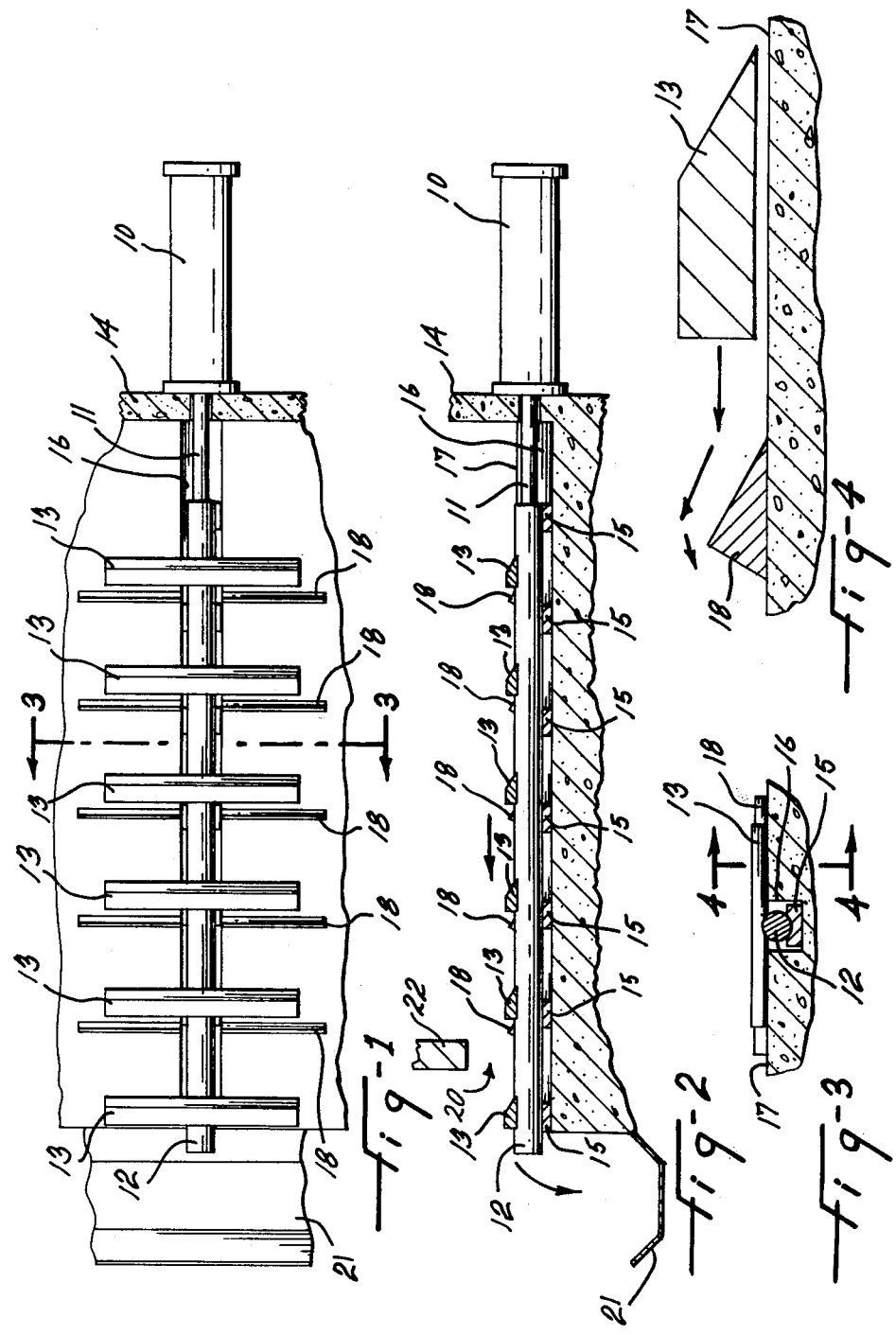

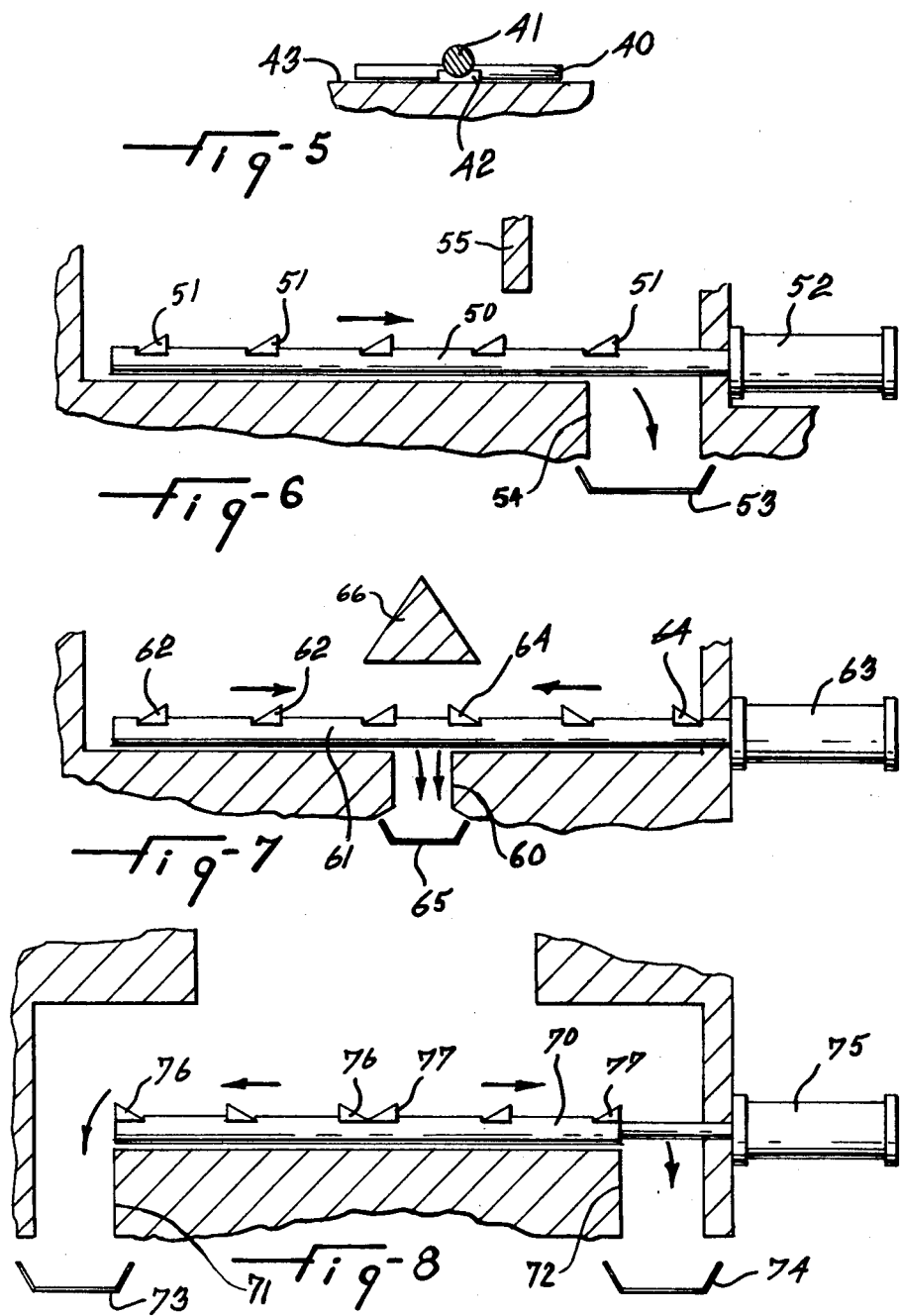

DISCHARGER MECHANISM

The present invention relates to a discharger mechanism for discharging solids from the bottom of a bin or hopper. More specifically, the present invention relates to a reciprocating discharger mechanism having a series of stoker cross bars to discharge solid materials from a bin or a hopper. The solid materials include granular materials, pellets, chips and all types of particulate materials that can be piled or placed in bins or hoppers.

Discharger mechanisms sometimes referred to as feeder mechanisms or stoker mechanisms for mounting on the floor of a hopper or bin are well known. One type of discharger mechanism is a chain conveying device which moves the material to a discharge outlet. Chain mechanisms, however, are subject to jamming and breakage, which can result in costly time delays. A more reliable type of discharger mechanism is a series of stoker cross bars mounted transversely between two stoker rods. The cross bars have a wedge shape configuration, and the stoker rods are reciprocated so that in one direction the cross bars push the material towards the discharge outlet and in the other direction the material rides up over the wedge of the cross bars. Thus although the motion of the cross bar is reciprocating, the motion of the material is only in one direction. A number of problems occur, however, with the two rod reciprocating discharger mechanism, one being the difficulty of moving the two stoker rods together, as the forces on the two rods are not likely to be the same and tend to vary continuously. If the cross bars become misaligned due to uneven loading then distortion can occur in the two stoker rods and this causes wear in the operating mechanism which can lead to the mechanism jamming.

Another problem that sometimes exists with the reciprocating discharger mechanism having two stoker rods is due to the width of the stoker cross bars. The stoker rods are spaced a sufficient distance apart to contain the operating mechanism. This distance may result in the stoker cross bars causing a tunneling effect in the pile of material within the hopper or bin. This tunneling effect causes a space to form above the discharger mechanism and prevents the material from discharging.

In the present invention there is provided a single stoker rod reciprocating discharger mechanism including a plurality of stoker cross bars attached at their mid-points to the stoker rod. Thus, the width of the cross bars is generally less than the width of the cross bars in a two stoker rod discharger mechanism. Therefore, two narrower discharger mechanisms can be provided which are arranged to reciprocate out of phase and thus tend to avoid the tunneling effect which occurs with a two stoker rod discharger mechanism. Furthermore, the single stoker rod discharger mechanism requires only a simple reciprocating device mounted at one end of the stoker rod and does not require a linkage system which may be subject to distortion and flexing resulting in maintenance problems. Furthermore, by having two single stoker rod discharger mechanisms rather than a single double stoker rod discharger mechanism, and by ensuring that the two single stoker rod mechanisms operate out of phase, then a more even discharge of material is attained than with a single two stoker rod mechanism.

Furthermore, the present invention provides a discharger mechanism for discharging solid materials from the underside of a pile, comprising:
a single stoker rod extending beneath the pile, one end being a discharge end,
reciprocating means for reciprocating the stoker rod longitudinally,
a plurality of stoker cross bars substantially perpendicular to the stoker rod are equispaced apart and rigidly attached at their centres thereof to the stoker rod,
each of the cross bars having a wedge shaped cross section with a vertical face facing towards the discharge end and an upward sloped face facing away from the discharge end at an angle less than 45°,
a plurality of fixed floor angles parallel and equispaced, each of the fixed floor angles interspaced and parallel with each of the cross bars, each floor angle having in cross section an upward sloped face facing towards the discharge end at an angle greater than 45°, and an upward sloped face facing away from the discharge end at an angle less than 45°.

In drawings which illustrate embodiments of the invention,

FIG. 1 is a top plan view of a single stoker rod reciprocating discharger mechanism of the present invention.

FIG. 2 is a cross sectional elevation of the discharger mechanism shown in FIG. 1.

FIG. 3 is a axial cross section of the discharger mechanism shown in FIG. 1 at line 3—3.

FIG. 4 is a cross-sectional detail of a stoker cross bar and fixed floor angle shown in FIG. 3 at line 4—4.

FIG. 5 is an axial cross section of another embodiment of a single stoker rod discharger mechanism.

FIG. 6 is a side elevation of another embodiment of a single stoker rod reciprocating discharger mechanism with a discharge outlet adjacent the operating cylinder.

FIG. 7 is a side elevation of a further embodiment of a single stoker rod discharger mechanism with a discharge outlet at the center.

FIG. 8 is a side elevation of yet another embodiment of a single stoker rod discharger mechanism with two discharge outlets, one at each end of the stoker rod.

Figure 9:
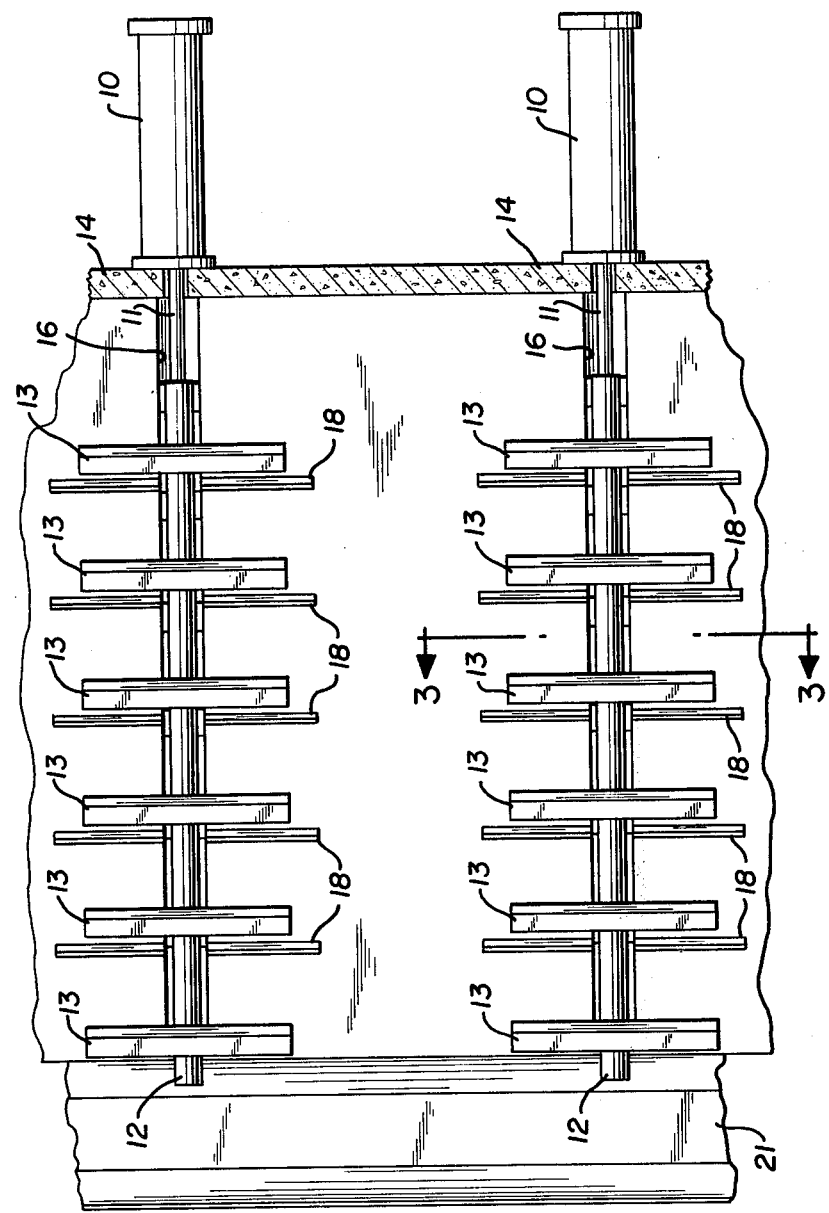
FIG. 9 is a top plan view of two adjacent, single stoker, rod discharging mechanism as shown in FIG. 1.

Referring now to FIGS. 1 to 4 the discharger mechanism includes a hydraulic cylinder 10 with a piston arm 11 connected to a single stoker rod or thrust member 12. Mounted transversely and substantially perpendicular to the stoker rod 12 are a plurality of stoker cross bars 13. The cross bars 13 are attached at their mid point to the stoker rod 12, and are evenly spaced along the stoker rod 12. The cross bars 13 have a wedge shape cross section with a vertical surface facing towards the discharge outlet of the unit and an upward sloped face facing away from the discharge outlet having a slope less than 45°. The base of the cylinder 10 is mounted on a thrust member 14 which may be the wall of a bin or hopper and must take the full force from the cylinder when the stoker rod 12 is being pushed or pulled. In some cases, the thrust member 14 is completely separate from the bin or hopper, and is anchored to a firm base. The stoker rod 12 rests on bearing blocks 15 which are set in a trough or cavity 16 in a floor 17 of a hopper or bin or beneath the pile of material. The stoker rod 12 also rests in this trough 16 and the cross bars 13 are attached to the top portion of the stoker rod 12 so they are located just above the floor 17 of the hopper or bin. Fixed floor angles 18 are provided firmly attached to the floor 17 and parallel to the cross bars 13. The floor angles 18 are positioned so they do not interfere with the reciprocating movement of the cross bars 13. In the embodiment shown the floor angles 18 are substantially in line with the bearing blocks 15. In FIG. 9, there is disclosed two discharge mechanisms of the type depicted in FIG. 1 mounted on the floor of the hopper or bin adjacent one another. Both discharge mechanisms discharge onto conveyor 21. The floor angles 18 have a cross section with an upward sloped surface facing towards the discharge outlet having a slope greater than 45° and an upward sloped surface facing away from the discharge outlet having a slope less than 45°, thus the floor angles 18 act to prevent the solid materials from backing up when the cross bars 13 are on the return stroke from the discharge stroke.

As may be seen in FIG. 2, the discharge outlet 20 below wall 22 of the hopper or bin is positioned at the other end of the stoker rod 12 from the cylinder 10 and a conveyor 21 is illustrated to take away the material being pushed through the discharge outlet 20. In another embodiment shown in FIG. 5 the cross bars 40 are attached below the stoker rod 41 and the stoker bearing blocks 42 are positioned on the floor 43 between the cross bars 40 such that the reciprocal movement of the cross bars 40 is between the bearing blocks 42. In this fashion no trough or cavity is necessary in the floor 43 of the hopper or bin. In another embodiment the bearing blocks 42 may be omitted completely and the cross bars 40 rest on the floor 43 of the hopper or bin and thus act as bearing blocks and slide backwards and forwards on the floor of the hopper or bin supporting the stoker rod 41. In still another embodiment, the round cross section of the stoker rod 41 may be replaced by a rectangular or other shaped cross section. In a still further embodiment the cross bars 40 may be attached above the stoker rod 41 with no trench or cavity provided in the floor 43 of the bin or hopper. The stoker rod 41 would have to slide on bearing blocks 42, and means would be provided to prevent the stoker rod 41 from twisting thus keeping the cross bars 40 in a horizontal plane. The space remaining between the bottom of the cross bars 40 and the floor 43 of the hopper or bin must be considered when materials are being discharged, and certain sizes of materials may not be suitable for such a discharger mechanism.

In operation, the discharger mechanism reciprocates and on one stroke the vertical surface of the cross bars push a layer of material resting between the cross bars towards the discharge outlet. On the return stroke, the layer material between the cross bars is prevented from moving back by the steeply sloped surface of the fixed floor angles, and thus the sloped surface of the cross bars pushes up the material and allows the cross bars to pass beneath the material. On the discharge stroke, the cross bars push the layer of material over the shallower sloped surface of the fixed floor angles. In another embodiment the steeply sloped surface of the floor angles facing the discharge outlet may be vertical.

Referring now to FIGS. 6, 7 and 8. In FIG. 6 a reciprocating discharger mechanism is shown wherein a stoker rod 50 has a plurality of cross bars 51 attached thereto with their vertical surfaces directed towards the operating cylinder 52. The discharge stroke is therefore in the direction of the arrow towards the cylinder 52 and beyond the hopper wall 55 to a conveyor 53 at the discharge outlet 54 carries the material away. In FIG. 7 a bin or hopper is shown with a central double discharge outlet 60 positioned below a discharge outlet cover 66. A stoker rod 61 has three cross bars 62 attached thereto with their vertical surfaces towards the operating cylinder 63 and three cross bars 64 attached thereto with their vertical surfaces away from the operating cylinder 63. In effect this stoker rod 61 represents two stoker rods in line, a stroke in one direction represents one discharge step for half the length of the stoker rod, and a stroke in the other direction represents a discharge step for the other half length of the stoker rod. In operation, when the stoker rod 61 moves towards the cylinder 63, the three cross bars 62 are on the discharge stroke and when the stoker rod 61 moves away from the cylinder 63 the three cross bars 64 adjacent the cylinder 63 are on the discharge stroke. The material passing through the discharge outlet 60 drops onto a conveyor 65 to be carried away. FIG. 8 shows a further embodiment of a discharger mechanism of the present invention wherein a stoker rod 70 is shown in a hopper having two discharge outlets 71 and 72 one on each side of the hopper for material to drop into two conveyors 73 and 74. The stoker rod 70 is connected to a cylinder 75 and three cross bars 76 mounted on the opposite end of the stoker rod 70 to the cylinder 75 have vertical surfaces facing away from the cylinder 75. Another three cross bars 77 mounted on the end of the stoker rod 70 adjacent the cylinder 75 have vertical surfaces facing towards the cylinder 73. In operation, when the stoker rod 70 moves away from the cylinder 75 the three cross bars 76 push material towards the discharge outlet 71 and when the stoker rod 70 moves towards the cylinder 75, the three cross bars 77 push material towards the discharge outlet 72. Thus, material is pushed to both discharge outlets 71, 72 and this during in and out movement of the stoker rod 70. Thus the force on the stoker rod 70 will be substantially the same for the in movement and the out movement.

It will be understood that various changes may be made to the embodiments shown herein without departing from the scope of this invention. For instance, the hydraulic cylinder disclosed in the illustrated embodiments may be replaced by any suitable type of reciprocating mechanism such as an electrical solenoid, rack and pinion, or pneumatic reciprocating mechanisms. The discharger mechanism may be used in many applications for piles of bark or chips in paper mills, rocks, resins, salt, sand, various types of sludges, cooked or raw foods. In fact, almost any solid materials that can be piled up on itself and is not damaged by the receiprocating motion of the discharger mechanism. The discharger mechanism assumes that the first material fed to it is the first material fed out. Thus, there is no opportunity for deterioration of the stored material in the pile.

The embodiments of the invention in which an exclusive property or privilege is claimed are defined as follows:

1. A discharger assembly for positively discharging solid materials from the underside of a pile mounted on a substantially horizontal floor of a hopper or bin, the floor having a discharge location at one end thereof, said assembly comprising at least two discharge mechanisms of substantially the same size mounted on the floor adjacent one another, each discharge mechanism comprising a single stoker rod extending beneath the pile, one end being a discharge end;

reciprocating means for reciprocating the stoker rod longitudinally, and comprising a stationary hydraulic cylinder mounted on a thrust member which operatively cooperates with said bin or hopper and a moving piston arm connected to one end of the stoker rod;

a plurality of stoker cross bars substantially perpendicular to the stoker rod, equispaced apart and rigidly attached at their centers thereof directly to the stoker rod;

each of the cross bars having a wedge shaped cross section with a vertical surface facing towards the discharge end and an upward sloped surface facing away from the discharge end at an angle less than 45°;

a plurality of fixed floor angles parallel and equispaced, each of the fixed floor angles interspaced and parallel with each of the cross bars such that a central cross bar is reciprocately moved between the floor angles adjacent thereto; and each floor angle having in cross section an upward steeply sloped face facing toward the discharge end at an angle greater than 45°, and an upward sloped surface facing away from the discharge end at an angle less than 45°, and wherein the single stoker rod rests on bearing blocks located in a trough, and the stoker cross bars rigidly connected directly to the top portion of the stoker rod such that the bottom of said cross bars is located proximate to and just above the floor and trough; and wherein the reciprocating means of the discharge mechanisms are adapted to reciprocate the corresponding stoker rods out of phase with one another.

2. A discharger assembly for positively discharging solid materials from the underside of a pile mounted on a substantially horizontal floor of a hopper or bin, the floor having a discharge location at each end thereof, said assembly comprising at least two discharge mechanisms of substantially the same size mounted on the floor adjacent one another, each discharge mechanism comprising a single stoker rod extending beneath the pile, each end being a discharge end;

reciprocating means for reciprocating the stoker rod longitudinally, and comprising a stationary hydraulic cylinder mounted on a thrust member which operatively cooperates with said bin or hopper and a moving piston arm connected to one end of the stoker rod;

a plurality of stoker cross bars substantially perpendicular to the stoker rod, equispaced apart and rigidly attached at their centers thereof directly to the stoker rod;

each of the cross bars having a wedge shaped cross section with a vertical surface directed away from the center of the stoker rod and towards the corresponding discharge end and an upward slope surface facing away from the corresponding discharge end at an angle less than 45°;

a plurality of fixed floor angles parallel and equispaced, each of the fixed floor angles interspaced and parallel with each of the cross bars such that a central cross bar is reciprocately moved between the floor angles adjacent thereto; and each floor angle having in cross section an upward steeply sloped surface facing toward the corresponding discharge end at an angle greater than 45°, and an upward sloped surface facing away from the corresponding discharge end at an angle less than 45°, and wherein the single stoker rod rests on bearing blocks located in a trough, and the stoker cross bars are rigidly connected directly to the top portion of the stoker rod such that the bottom of said cross bars is located proximate to and just above the floor and trough; and wherein the reciprocating means of the discharge mechanisms are adapted to reciprocate the corresponding stoker rods out of phase with one another.

3. A discharger assembly for positively discharging solid materials from the underside of a pile mounted on a substantially horizontal floor of a hopper or bin, the floor having a discharge location at a central portion thereof, said assembly comprising at least two discharge mechanisms of substantially the same size mounted on the floor adjacent one another, each discharge mechanism comprising a single stoker rod extending beneath the pile, reciprocating means for reciprocating the stoker rod longitudinally, and comprising a stationary hydraulic cylinder mounted on a thrust member which operatively cooperates with said bin or hopper and a moving piston arm connected to one end of the stoker rod;

a plurality of stoker cross bars substantially perpendicular to the stoker rod, equispaced apart and rigidly attached at their centers thereof directly to the stoker rod, the discharge location being located at a position adjacent the center of said stoker rod;

each of the cross bars having a wedge shaped cross section with a vertical surface facing towards the center of the stoker rod and hence the discharge location, and an upward sloped surface facing away from the center of the stoker rod and hence the discharge location at an angle less than 45°;

a plurality of fixed floor angles parallel and equispaced, each of the fixed floor angles interspaced and parallel with each of the cross bars such that a central cross bar is reciprocately moved between the floor angles adjacent thereto; and each floor angle having in cross section an upward steeply sloped face facing toward the discharge location at an angle greater than 45°, and an upward sloped surface facing away from the discharge location at an angle less than 45°, and wherein the single stoker rod rests on bearing blocks located in a trough, and the stoker cross bars are rigidly connected directly to the top portion of the stoker rod such that the bottom of said cross bars is located proximate to and just above the floor and trough; and wherein the reciprocating means of the discharge mechanisms are adapted to reciprocate the corresponding stoker rods out of phase with one another.

* * * * *

REEXAMINATION CERTIFICATE (749th)

United States Patent [19]

Debor

[11] B1 4,157,761

[45] Certificate Issued Aug. 18, 1987

[54] DISCHARGER MECHANISM

[75] Inventor: Harald H. A. Debor, Katevale, Canada

[73] Assignee: S. W. Hooper & Company, Ltd., Sherbrooke, Canada

Reexamination Request:
No. 90/000,605, Aug. 9, 1984

Reexamination Certificate for:
Patent No.: 4,157,761
Issued: Jun. 12, 1979
Appl. No.: 821,952
Filed: Aug. 4, 1977

[30] Foreign Application Priority Data

Feb. 2, 1977 [GB] United Kingdom ............... 4210/77

[51] Int. Cl.⁴ .......................................... B65G 65/44
[52] U.S. Cl. .................................. 414/304; 198/737; 198/747

[56] References Cited

U.S. PATENT DOCUMENTS

| | | | |
|---|---|---|---|
| 1,837,994 | 12/1931 | Preston | 198/747 |
| 2,592,010 | 4/1952 | Cole et al. | 432/139 |
| 3,128,017 | 4/1964 | Bacoka | 222/243 |
| 3,338,435 | 8/1967 | Rey | 414/293 |
| 3,366,255 | 1/1968 | Evans, Jr. | 414/525 R |
| 3,525,446 | 8/1970 | Grafstrom | 414/525 R |
| 3,882,997 | 5/1975 | Dudley | 198/747 X |
| 3,923,149 | 12/1975 | Stearns | 198/747 |

Primary Examiner—Robert J. Spar
Assistant Examiner—Jonathan D. Holmes

[57] ABSTRACT

A discharger mechanism is disclosed for discharging solids from the bottom of a pile. The discharger has a single reciprocating stoker rod and thus avoids misalignment and distortion so common in two reciprocating stoker rod discharger mechanisms. The discharger has a single stoker rod extending beneath a pile, one end of the rod being a discharge end, a reciprocating means reciprocates the stoker rod longitudinally. A plurality of stoker cross bars, substantially perpendicular to the stoker rod, are equispaced apart and rigidly attached at their centers thereof to the stoker rod, each of the cross bars has a wedge shaped cross section with a vertical surface facing towards the discharge end and an upward sloped surface facing away from the discharge end at an angle less than 45°. A plurality of fixed floor angles, parallel and equispaced, each of the fixed floor angles interspaced and parallel with each of the cross bars, each floor angle having in cross section an upward sloped surface facing towards the discharge end at an angle greater than 45°, and an upward sloped surface facing away from the discharge end at an angle less than 45°.

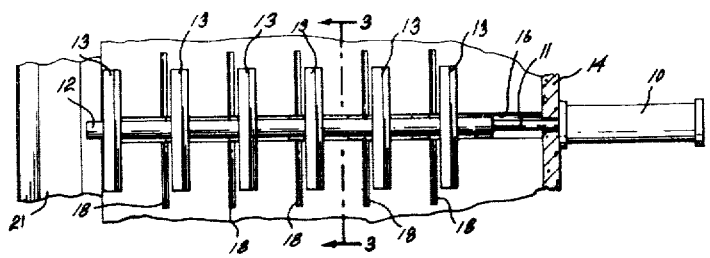

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *